No. 757,094. PATENTED APR. 12, 1904.
R. B. COLTRIN.
CEMENT MOLDING APPARATUS.
APPLICATION FILED OCT. 22, 1903.
NO MODEL.
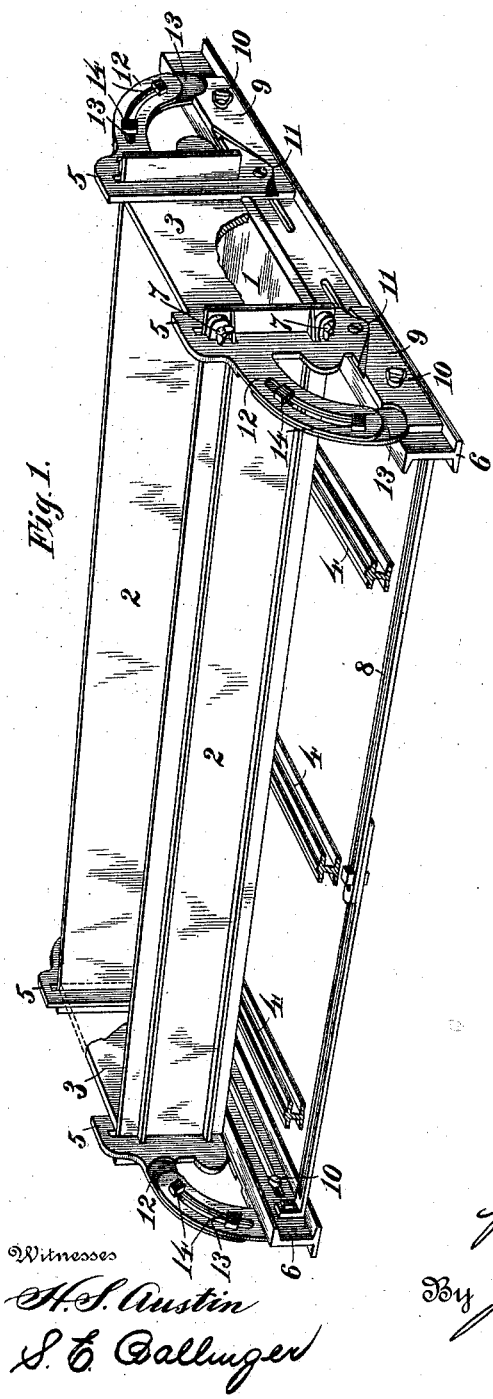
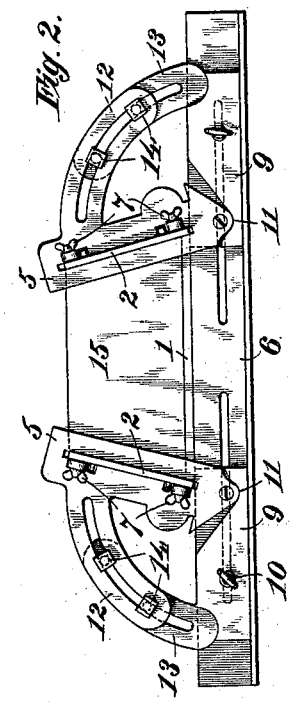
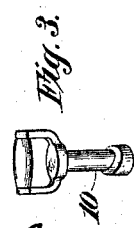
Witnesses
H. S. Austin
S. E. Ballinger
Inventor
Robert B. Coltrin,
By Julian C. Dowell & Son
his Attorneys.
THE NORRIS PETERS CO., PHOTO-LITHO., WASHINGTON, D. C.

No. 757,094. Patented April 12, 1904.

UNITED STATES PATENT OFFICE.

ROBERT B. COLTRIN, OF JACKSON, MICHIGAN.

CEMENT-MOLDING APPARATUS.

SPECIFICATION forming part of Letters Patent No. 757,094, dated April 12, 1904.

Application filed October 22, 1903. Serial No. 178,073. (No model.)

*To all whom it may concern:*

Be it known that I, ROBERT B. COLTRIN, a citizen of the United States, residing at Jackson, in the county of Jackson and State of Michigan, have invented certain new and useful Improvements in Cement-Molding Apparatus; and I do hereby declare the following to be a full, clear, and exact description of the invention, such as will enable others skilled in the art to which it appertains to make and use the same.

My invention relates to molding apparatus for making stone or blocks of cement or other plastic material, particularly for molding blocks for buildings, walls, or other structures, either rectangular or of other desired form or with vertical or inclined sides, such as the wedge-shaped blocks or voussoirs used in arches, and for making elongated stone, such as slabs, curbs, sills, and copings.

The principal objects of the invention are, first, to produce an exceedingly simple, efficient, and convenient apparatus of this character having movable or separable members adapted to be brought together or adjusted to molding position and to be separated or moved away from the molded block to permit removal of the latter; second, to provide in such an apparatus efficient means for adjustments for varying the length, breadth, and other dimensions of the manufactured stone or blocks; third, to provide efficient means for adjusting the apparatus for molding either vertical-sided or inclined or wedge-shaped blocks, and, fourth, to improve the structure and arrangement of the apparatus as a whole, as well as the construction of its various parts.

The invention will first be described with reference to the accompanying drawings, which are to be taken as a part of this specification, and will then be pointed out more particularly in the annexed claims.

In said drawings, Figure 1 is a perspective view of a molding apparatus embodying my invention, showing the mold in position for making rectangular or vertical-sided blocks. Fig. 2 is an end view of the same, showing the mold in position for making wedge-shaped or inclined-sided blocks. Fig. 3 is a detail view of one of the fastening devices used in the illustrated apparatus.

The apparatus illustrated is especially designed for molding large elongated stone or blocks, though by reason of its capabilities of adjustment it is equally suitable for making stone of smaller dimensions.

Referring to said illustrated machine by specific reference-symbols, the mold is formed by a suitable base or bottom (indicated by the numeral 1) and side and end members, (denoted by the numbers 2 and 3, respectively.) The mold may of course be of different forms or its members of different configurations in accordance with the shape of the stone or block to be molded, which, however, is usually rectangular or flat-sided, wherefore the side and end members of the mold are here represented as flat rectangular plates.

The base or bottom board 1 is shown resting on cross supports or rails 4, on which after the cement block is molded and released from the mold said base, with the molded block thereon, can be slid away and removed.

The side plates or members 2 are shown supported or held in upright position by standards 5, mounted on cross supports or beams 6 at the opposite ends of the apparatus. The end plates or members 3 are shown interposed between the side plates or members, resting on the bottom and held from outward movement by abutment against the inner sides of said standards. For the purpose of adjusting the mold to form stone or blocks of different lengths the side plates are preferably held adjustably to the standards or, as shown, they extend through vertical slots in said standards, so that the beams or supports 6, with the standards mounted thereon, can be moved toward and from each other, and the ends of the side plates project more or less through the slotted standards accordingly. The standards are shown having lugs or ears in which set-screws 7 are inserted to bind against the side plates and hold them rigidly into whatever position the standards are moved. The beams or supports 6 may be connected by longitudinal rods or braces 8, which for the purpose of this lengthwise adjustment are formed extensible, in this instance one rod or bar having a bolt or binding-screw inserted through a longitudinal slot in the other. For the purpose of adjustments for varying the breadths of the stone or blocks to be molded the standards are preferably mounted adjustably on said cross beams or supports 6. In the illustrated apparatus the supports 6 are rails or flanged beams, and the standards 5 rise from slides or members 9, resting on the lower outer flanges of said beams, adapted to be moved toward or from each other and adjustably secured to said beams, as by bolt-and-slot or equivalent fastenings. A simple and convenient fastening device is indicated by the symbol 10 and disclosed in detail in Fig. 3. It consists of a short stud or bolt inserted through the slide 9 and slot in the beam 6, having a handle or thumb-piece bearing against the outer side of the slide and a head or knob bearing against the inner side of the beam, the latter having an inclined or cam face, so that when held in one position the device loosens the slide and permits movement or adjustment thereof, while when turned it binds against the beam and secures the slide rigidly in place. It will be understood that end plates of different lengths are used for different widths between the side plates. Provision is also made in the present apparatus for angular adjustment of the side plates or members for the purpose of molding inclined-sided or wedge-shaped blocks, such as the keystones and voussoirs of arches. To this end the standards 5 are pivotally or adjustably mounted on the slides 9, so as to stand either vertical or inclined, and suitable devices are employed for locking or securing them in adjusted position. As shown, the lower ends of the standards and inner ends of the slides are reduced or cut away at their adjacent faces to form lap-joints or render the surfaces of said parts flush with each other, and said lower ends of the standards are rounded, pivoted to the slides, and supported on the rounded upper edges of their cut-away parts, as indicated at 11, so as to take all strain off the pivots. To lock said parts rigidly in position, said standards and slides are represented having coöperating or overlapping slotted segments or arms 12 and 13, adapted to be secured together by bolts 14, inserted through their slots. End plates having inclined side edges, as indicated by the symbol 15 in Fig. 2, are used with the apparatus for molding such inclined-sided blocks.

In operation the mold is adjusted to proper position by selecting the proper end plates, arranging them in place on the beams or supports 6, then bringing the side plates against them, and fastening the parts rigidly by means of the several fastening bolts or connections. The prepared cement or plastic material to be molded is then placed in the mold and rammed or packed as hard as desired. If a solid block is to be made, the mold is of course left unobstructed inside; but if a hollow block is to be made any suitable inner core or cores may be used. A top plate may also be employed to render the upper surface of the block flat and smooth and apply pressure. After the molded block or stone has been permitted to set sufficiently the fastenings 10 at one side of the apparatus may be taken out and the unfastened slides 9 with the standards 5 carried thereby, and the side plate 2 held in such standards may be moved outward and entirely away from the block or off the apparatus. The end plates may then be detached, leaving the block free, and the block may then be moved by the bottom board or base on the rails or supports 4 and removed. The end plates may then be replaced and the detached side of the apparatus brought back into position and fastened in place so as to form the mold for another block. It will be observed that no unfastening of any of the bolts or connections or disturbance of adjustments is necessary, except detachment of the fastening devices 10 at one side of the apparatus, so that when the mold is once set it may be opened to release the block and reset for another block repeatedly without reference to adjustments.

The apparatus is susceptible of various modifications in details of construction and arrangement without departing from the scope of my invention.

Having thus fully described my invention, what I claim as new, and desire to secure by Letters Patent of the United States, is—

1. In a molding apparatus, opposite supports, side members held at their opposite ends by said supports, and end members interposed between said side members and held in place by abutment against said supports, said side members being separable from each other to break the mold.

2. In a molding apparatus, opposite supports adapted to be moved toward or away from each other, side members having their opposite ends or parts held by said supports, and end members interposed between said side members and held from outward movement by abutment against said supports.

3. In a molding apparatus, opposite supports having slotted standards rising therefrom, side members transversely disposed thereto and each held in a corresponding pair of said slotted standards, and end members interposed between said side members and held against the inner faces of said standards, and extensible rods connecting said supports.

4. In a molding apparatus, opposite supports, and side members held by and between said supports and adjustably attached thereto to permit the supports to be moved toward or from each other or lengthwise of said members, said side members in connection with suitable end members constituting a mold.

5. In a molding apparatus, opposite side mold plates or members, cross-supports therefor, slides on said supports having angularly-adjustable slotted standards in which said plates are held, and end plates interposed between said side plates and held against outward movement by said standards.

6. In a molding apparatus, opposite supports, opposite mold members held by and between said supports and permitting adjustment of the latter with respect to each other, and extensible rods or braces connecting said supports.

7. In a molding apparatus, opposite supports each having a pair of slotted standards, and opposite mold plates or members transversely disposed thereto and each held in or extending through corresponding opposite slotted standards, whereby said supports can be moved from and toward each other.

8. In a molding apparatus, opposite mold plates or members, opposite cross-supports therefor each having a pair of slotted standards in which said plates are held, and cross-plates interposed between said former plates and held from outward movement by said standards.

9. In a molding apparatus, opposite side plates or mold members, opposite cross-supports therefor having slotted standards in which said plates are held, whereby said supports can be moved from and toward each other, end plates interposed between said side plates and held from outward movement by said standards, and means permitting separation of one plate with its standards from the other.

10. In a molding apparatus, opposite mold plates or members cross-supports therefor having slotted standards in which said plates are held, lugs projecting from said standards and set-screws in said lugs for binding against said plates.

11. In a molding apparatus, opposite mold plates or members, cross-supports therefor having slotted standards in which said plates are held, and extensible rods or braces connecting said supports.

12. In a molding apparatus, opposite side mold plates or members, cross-supports therefor, slides on said supports having angularly-adjustable slotted standards in which said plates are held, end plates interposed between said side plates and held against outward movement by said standards, and means for securing said parts rigidly with relation to each other.

13. In a molding apparatus, a mold plate or member having supporting-slides therefor and cross ways or supports for said slides, a slide-locking device comprising a stud or bolt inserted through one part and a longitudinal slot in the other, having a handle engaging one member and an inclined or cam-faced head engaging the other adapted in one position to release the slide and in another position to bind.

14. In a molding apparatus, a mold plate or member, supporting-slides therefor, and opposite crossways for said slides consisting of outwardly-flanged supports, said slides resting on said flanges and against the outer sides of said ways or supports.

15. In a molding apparatus, a mold plate or member, opposite supports therefor having pivoted or angularly-adjustable standards which hold said member, said standards and supports having coöperating slotted segments or arms, and fastening devices in the slots of said segments.

16. In a molding apparatus, opposite side mold plates or members, cross-supports therefor, slides on said supports having angularly-adjustable standards which hold said plates, end plates, and means for adjustment of the latter toward and from each other.

In testimony whereof I affix my signature in presence of two witnesses.

ROBERT B. COLTRIN.

Witnesses:
MARY A. WILSON,
OSGOOD H. DOWELL.